Aug. 23, 1966   J. F. ENGLER   3,267,651
MOWER DRAWBAR CONNECTION

Original Filed Nov. 3, 1960   2 Sheets-Sheet 1

John F. Engler
INVENTOR.

BY
ATTORNEY

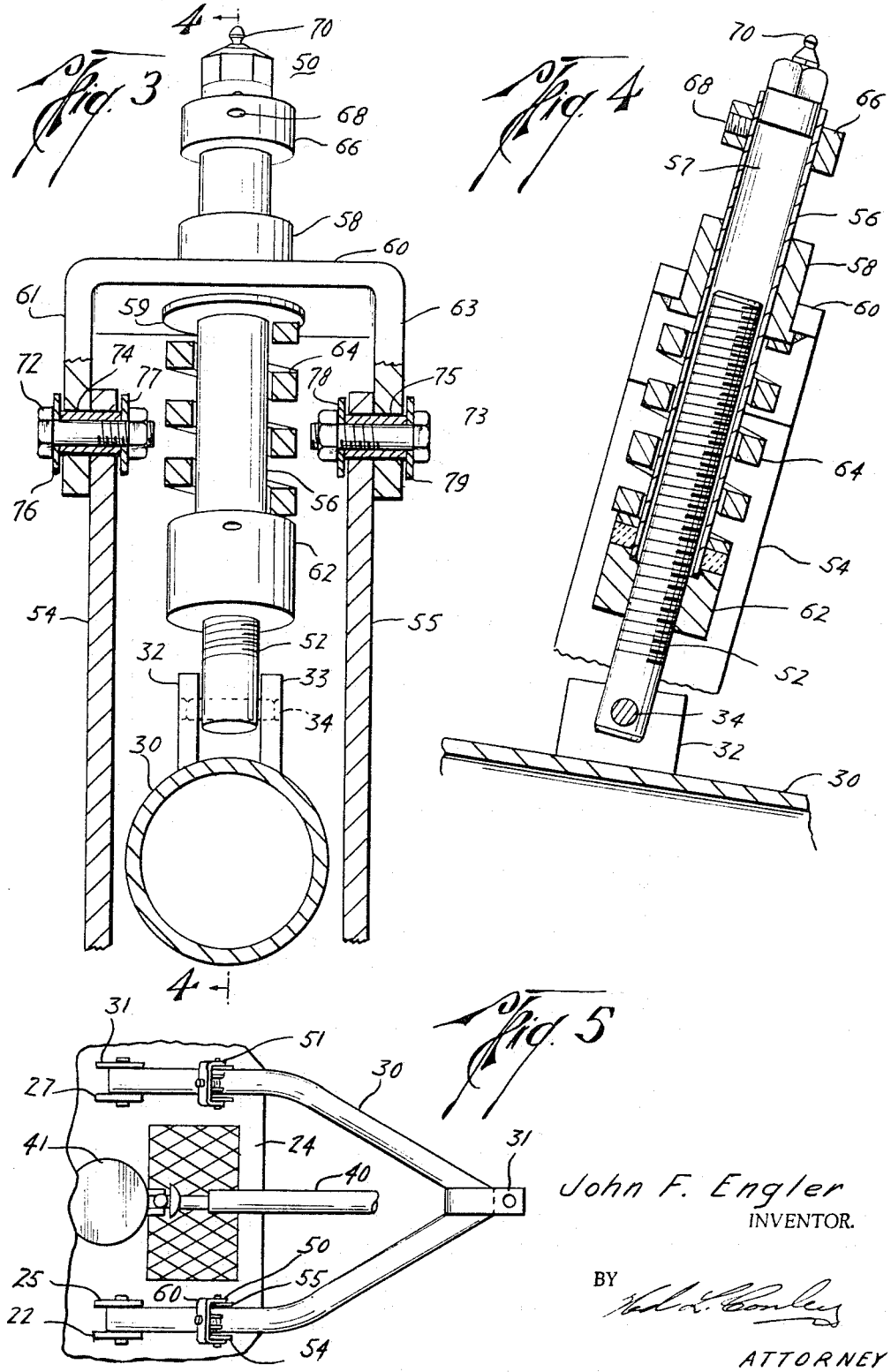

United States Patent Office 3,267,651
Patented August 23, 1966

3,267,651
MOWER DRAWBAR CONNECTION
John F. Engler, % Engler Mfg. Corp.,
P.O. Box 7616, Houston, Tex.
Original application Nov. 3, 1960, Ser. No. 66,967.
Divided and this application July 10, 1963, Ser.
No. 294,107
4 Claims. (Cl. 56—6)

This application is a division of co-pending application Serial Number 66,967, filed November 3, 1960.

This invention pertains generally to mechanical apparatus and particularly to apparatus used in conjunction with surface vehicles.

Frequently, surface vehicles such as tractors, have attached thereto apparatus such as a mower similar to the mower disclosed in my U.S. Patent 2,952,961, issued September 20, 1960, and my pending application 820,413, filed June 15, 1959, and now abandoned. Usually the movement and effectiveness of the attached apparatus is directly related to the movement of the tractor.

In the usual construction, the tractor and mower are rigidly connected together, so that when the tractor crosses a ditch or other depression in the terrain it pulls the mower down with it, so that the blades dig into the ground, causing damage to the blades and power transmission apparatus, as well as greatly increasing the power required to operate the mower.

In practicing the invention, a drawbar having resilient means attached thereto is flexibly connected between a surface vehicle such as a tractor and traction apparatus such as a mower. The resilient means include adjustable means which may provide a particular setting which is above the normal setting above the ground for the mower. Slight vertical movement of the tractor is smoothed out by the resilient means, thereby giving the drawbar a floating effect and providing stabilized operation to the traction apparatus. The drawbar and resilient means are durable, economical, compact, and effective in reducing the downward thrust of the mower on the blades when the rear wheels of the tractor cross a depression in the terrain so that the front of the mower is depressed and the blades come in contact with the ground or obstructions on the ground. Thus, time-consuming equipment breakdowns are minimized.

Figure 1:
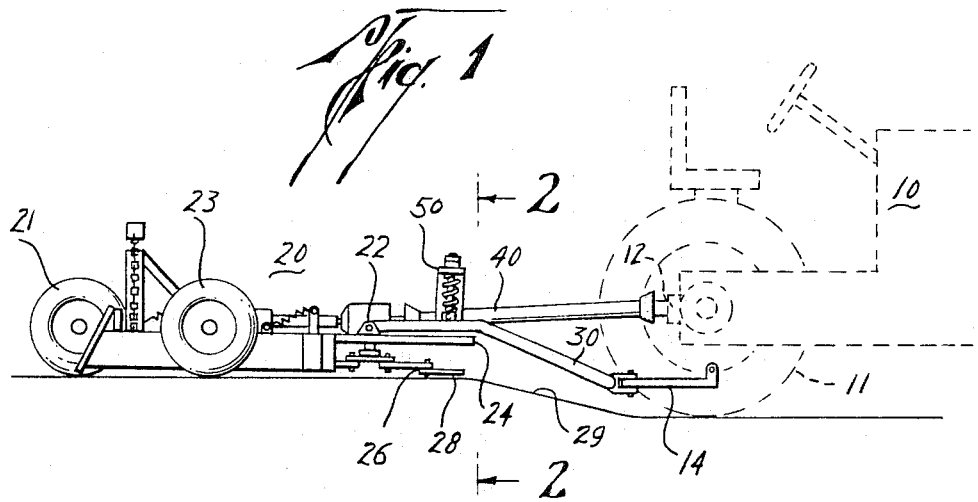
Figure 2:
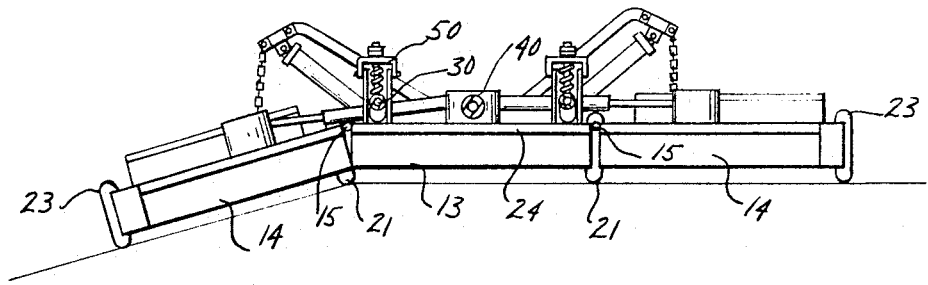

In the drawings:
FIGURE 1 is a side view of a tractor pulling a mower having a drawbar attachment wherein the invention is incorporated;
FIGURE 2 is a front view of the mower of FIGURE 1, taken along line 2—2 of FIGURE 1;
FIGURE 3 is a plan and partial sectional view of the resilient means utilized in the invention;
FIGURE 4 is a sectional view taken along lines 4—4 of FIGURE 3; and
FIGURE 5 is a plan view of the drawbar attachment shown in FIGURES 1 and 2.

Referring in more detail to the drawings, FIGURE 1 shows a surface vehicle 10 such as a tractor having traction apparatus 20 such as a mower coupled thereto through drawbar 30 and driveshaft 40. Tractor 10 may have a plurality of wheels similar to wheel 11. Mower 20 includes wheels 21 and 23. Driveshaft 40 may be coupled in a known manner between the mower 20 and power take-off 12 of tractor 10. Projection 14 on tractor 10 is coupled to drawbar 30 which is pivotally coupled to ears 22 projecting from platform 24 on mower 20. Resilient means 50 are coupled to drawbar 30 and platform 24 of mower 20 and such coupling will be explained subsequently in more detail.

Mower 20 may have a plurality of blades 26 which cut grass, weeds, or other growth. In FIGURE 1 tractor 10 is moving over ground which has a lower elevation than the ground over which mower 20 is passing. In accordance with the invention, resilient means 50 and the pivotal connection allow pivotal movement of the drawbar 30 with respect to the mower 20.

As will be seen from FIGURE 2, the mower to which the drawbar of this invention is preferably attached is a segmented mower, having a central section 13 supported by rear wheels 21, and two side sections 16 supported by hinges 15 and side wheels 23. It will be noted that, because of the flexible connection provided by hinges 15, side wheels 23 provide no support for center section 13. Thus the entire weight of the center section is supported by the rear wheels 21 and the drawbar 30, and when the drawbar is lowered, as when the tractor crosses terrain of lower elevation than that traversed by wheels 21, the front of the mower is lowered, so that cutting blades 26 contact the ground. However, the pivotal, resilient connection of the drawbar prevents the weight of the tractor from bearing upon the front of the mower, so that there is less downward thrust exerted upon the blades.

FIGURE 3 is a plan and partial sectional view of resilient means 50 shown in FIGURES 1 and 2. Drawbar 30 having lips 32 and 33 is pivotally coupled by dowel pin 34 to threaded member 52 which is disposed in hollow cylinder housing or piston 56. Cylinder housing 56 passes through bushing 58 which is fitted in the central portion of clevis 60.

A threaded adjustment nut 62 provides positioning of hollow cylinder housing 56 with respect to threaded member 52. Spring 64 is intermediate the nut 62 and lower face 59 of bushing 58 and the compressive force applied to spring 64 is varied with force applied on nut 62 and cylinder housing 56. Collar 66 which has a set screw 68 is positioned near the end of cylinder housing 56 to limit movement thereof. On the other end of cylinder housing 56 is a grease fitting 70 through which lubricant may be provided to cylinder housing 56.

Clevis 60 which includes flanges 61 and 63 is connected pivotally by fasteners such as bolts 72 and 73 to support members or ears 54 and 55 which are rigidly mounted on platform 24 of the mower as shown in FIGURE 2. Pivot bushings 74 and 75 pass through apertures in ears 54 and 55 and flanges 61 and 63. Flat washers 76 and 77 are positioned on each end of bushing 74 and flat washers 78 and 79 are positioned on each end of bushing 75 thereby providing pivotal movement of flanges 61 and 63 of clevis 60 relative to ears 54 and 55. Pivotal movement of flanges 61 and 63 allows cylinder housing 56 to have smoother movement within bushing 58 during extreme movements of drawbar 30.

FIGURE 4 is a sectional view taken along line 4—4 of FIGURE 3. Threaded member 52 is disposed within cylindrical space 57 formed by the wall of cylinder housing 56. Rotation of cylinder housing 56 causes threaded adjustment nut 62 to move on threaded member 52 and vary the positioning of drawbar 30 relative to the ears mounted on the mower platform. Rotation of housing 56 provides slight elevation above the normal cutting level of the mower. This adjustment is made prior to commencement of the mowing operation.

Thus when drawbar 30 has vertical movement, cylinder housing 56 moves within bushing 58 and spring 64 thereby providing a cushioning or floating effect on the mower through drawbar 30. Collar 66 acts as a stop for downward movement of cylinder housing 56 and the resiliency of spring 64 limits the upward movement.

FIGURE 5 is a plan view of the drawbar 30 showing the pivotal coupling thereof to ears 22, 25, 27 and 31 and to resilient means 50 and 51 on mower platform 24. Member 31 is used to couple the center point of drawbar to the tractor and driveshaft 40 is coupled to power unit 41 for actuating the blades of the mower in a manner disclosed in my patent and my application referred to previously. Resilient means 50 and 51 are identical and provide cushioning for the mower as explained previously. FIGURE 5 illustrates the pivotal coupling of clevis 60 to ears 54 and 55 which are rigidly mounted on platform 24. Resilient means 51 has a similar coupling arrangement.

Thus, the invention provides a drawbar of fork member which may be pivotally coupled to a traction device such as a mowing machine. The drawbar also is connected through resilient means to a platform on the mower so that when the drawbar is pulled by a surface vehicle such as a tractor, a cushioning or floating effect is provided on the mower. If the tractor crosses a ditch or other depression in the terrain, the pivotal connection and the resilient means prevent the weight of the tractor from bearing on the front of the mower, so that the downward movement of the tractor does not force a corresponding downward movement of the mower, beyond that caused by the weight of the mower itself. Except for the pivotal connection and the resilient means, the weight of the tractor would bear on the front of the mower and cause the mower blades to dig in. The resilient means greatly decrease this tendency, so that the mower blades are not pulled into the ground. If the mower blades come in contact with the ground the downward thrust of the mower thereon is reduced, thereby reducing machinery breakdowns and providing stability to the mowing operation.

While a preferred embodiment of the invention has been shown and described many modifications thereof can be made by one skilled in the art without departing from the spirit of the invention and it is desired to cover by Letters Patent all forms of the invention falling within the scope of the following claims.

I claim:
1. A moving machine comprising
 a platform,
 mower cutter means suspended beneath said platform,
 support means on said platform for supporting said cutter means above ground level,
 a drawbar,
 means pivotally coupling said drawbar to said platform at a point forward of said support means for relative movement in a vertical plane,
 a clevis member pivotally mounted on said platform forward of the drawbar connection,
 an aperture in said clevis,
 a rod attached to said drawbar and extending upwardly through said aperture, and
 means engaging said rod and said clevis adapted to allow reduced downward movement of said platform upon downward pivoting of said drawbar so as to decrease the engagement of the cutter means with the ground.

2. A mowing machine as defined by claim 1 wherein the last-named means comprises resilient means.

3. A mowing machine comprising
 a platform having front and rear ends,
 support means adjacent the rear end of said platform,
 a drawbar extending forwardly from said platform,
 mower cutter means normally suspended above the ground level beneath said platform,
 means pivotally coupling said drawbar to said platform at a point forwardly of said support means for relative movement in a vertical plane,
 a clevis pivotally mounted on said platform forwardly of the drawbar connection,
 an aperture in said clevis,
 a rod attached to said drawbar and extending upwardly through said aperture, and
 resilient means bearing upwardly on said clevis and downwardly on said rod,
 whereby said drawbar normally supports the front end of the platform so that the cutter means are above ground level, and allows upward pivoting of the platform with respect to the drawbar when the drawbar is pivoted downwardly far enough for the cutter means to dig into the ground.

4. A mowing machine comprising
 a platform having front and rear ends,
 support means adjacent the rear end of said platform,
 a drawbar extending forwardly from said platform,
 mower cutter means normally suspended above the ground level beneath said platform,
 means pivotally coupling said drawbar to said platform at a point forwardly of said support means for relative movement in a vertical plane,
 a clevis pivotally mounted on said platform forwardly of the drawbar connection,
 an aperture in said clevis,
 a rod attached to said drawbar and extending upwardly through said aperture, and
 means engaging said rod and said clevis to normally support the front end of the platform so that the cutter means is above the ground, and adapted to provide some support for the platform when the drawbar is pivoted downwardly far enough for the cutter means to hit the ground.

References Cited by the Examiner

UNITED STATES PATENTS

| | | | |
|---|---|---|---|
| 2,706,879 | 4/1955 | Barrentine | 56—254 |
| 2,710,514 | 6/1955 | Broussard | 56—25.4 |
| 2,719,393 | 10/1955 | Bowersox | 172—678 |
| 2,743,567 | 5/1956 | Martin | 56—6 |
| 2,944,614 | 7/1960 | Shipp | 172—678 |

ANTONIO F. GUIDA, Acting Primary Examiner.

A. G. STONE, T. GRAHAM CRAVER, RUSSELL R. KINSEY, Examiners.

J. O. BOLT, Assistant Examiner.